United States Patent [19]

Harben, Jr.

[11] 3,724,032
[45] Apr. 3, 1973

[54] METHOD FOR KILLING FOWL
[75] Inventor: Grover S. Harben, Jr., Gainesville, Ga.
[73] Assignee: Gainesville Machine Company, Inc., Gainesville, Ga.
[22] Filed: Apr. 1, 1970
[21] Appl. No.: 24,696

[52] U.S. Cl............................................17/52, 17/11
[51] Int. Cl.......................................................A22c 21/00
[58] Field of Search.......................................17/11, 52

[56] References Cited

UNITED STATES PATENTS

| | | | |
|---|---|---|---|
| 2,103,288 | 12/1937 | Hunt | 17/11 |
| 1,970,294 | 8/1934 | Field | 17/11 |
| 3,477,092 | 11/1969 | Simmons | 17/11 |
| 2,306,773 | 12/1942 | Biffinger | 17/11 |
| 2,621,362 | 12/1952 | Cosden | 17/11 |

FOREIGN PATENTS OR APPLICATIONS 444,296  10/1912  France ...................................17/11

Primary Examiner—Robert W. Michell
Assistant Examiner—John F. Pitrelli
Attorney—Newton, Hopkins & Ormsby

[57] ABSTRACT

A chicken or other fowl suspended in a head-lowermost position is killed by making a saw-cut or similar opening through the skull of the bird for severing the artery going to the brain and eyes thereof at the base of the brain.

4 Claims, 4 Drawing Figures

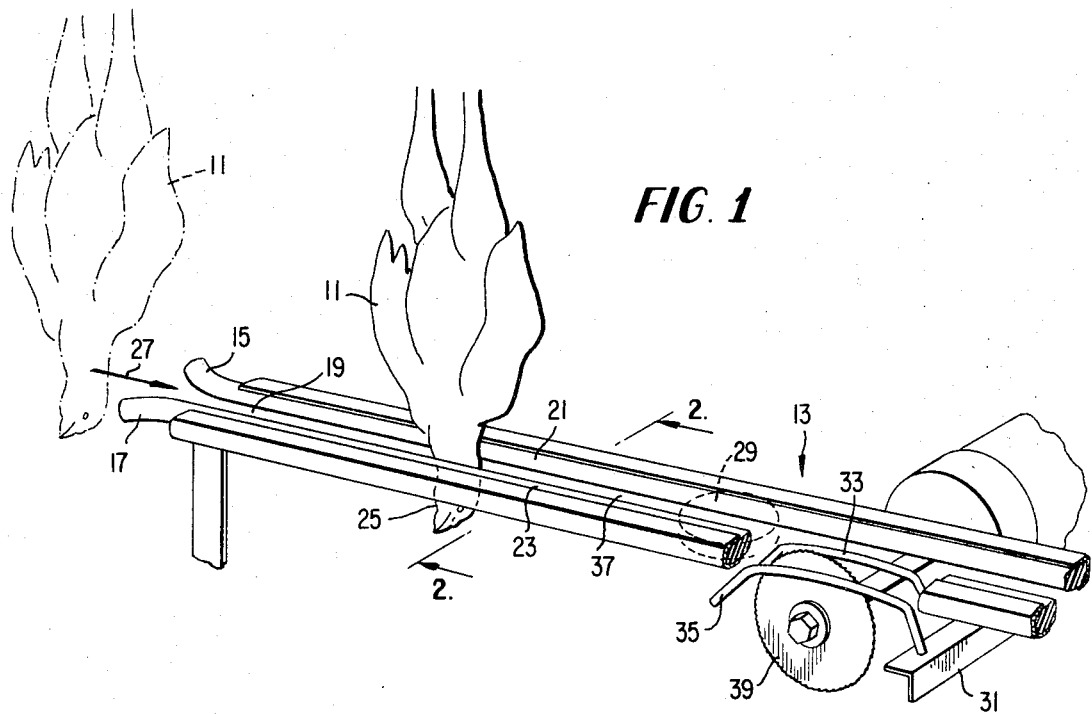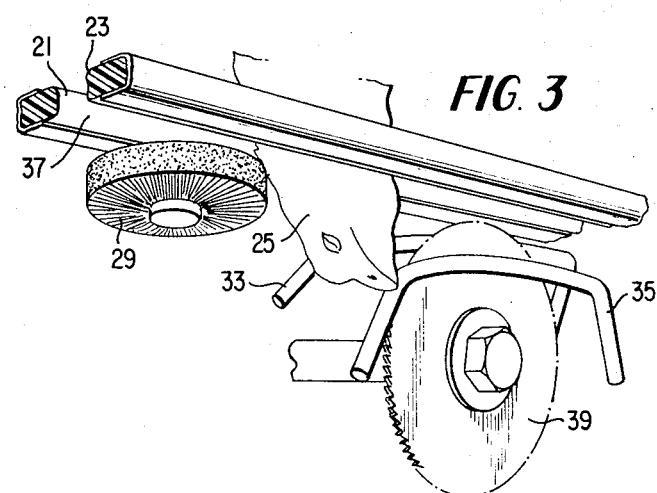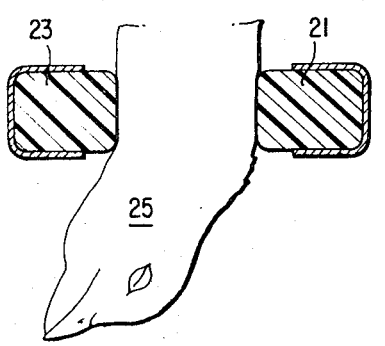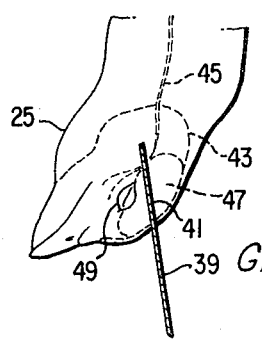

METHOD FOR KILLING FOWL

BACKGROUND OF THE INVENTION

This invention relates generally to the processing of poultry and more particularly to a novel method of killing a chicken or other fowl as it is conveyed along a poultry processing line suspended in a head lowermost position and an improved apparatus for automatically performing the operation in accordance with that method.

In the processing of poultry and other fowl, the bird is usually suspended head down from a shackle which travels along an overhead conveyor to those locations at which various processing operations are performed. Most of these processing operations are performed automatically by various poultry processing devices. However, the killing of the bird is still most often accomplished by hand because the automatic mechanical killing devices heretofore available have not been completely satisfactory. This is because, in the past, poultry, such as chickens and the like, have normally been killed by cutting the neck skin of the bird and the jugular vein in order that the heart continues to beat and pump the blood from the fowl to permit complete draining of the blood therefrom as it bleeds to death and because it is undesirable to also sever the spinal cord, windpipe or gullet of the bird at the time the jugular vein is severed.

Severing the spinal cord of the bird causes muscular spasms to occur which make it difficult, if not impossible, to further process the bird, the spasms causing blood draining from the jugular vein to be thrown over a wide area rather than to be confined to the area of the processing line, and in addition, the severing of the spinal cord is undesirable because it stops the heartbeat of the bird. The continuing heartbeat obtained for a period of time when only the jugular vein of the bird is severed is highly desirable because it causes blood to be pumped from the bird's body rather than simply to flow from the body by gravity, which has been found to improve the quality of the meat.

If the windpipe is severed at the time that the jugular vein is severed, the continuing heartbeat of the bird which produces the highly desirable pumping of blood from the body of the bird will also cause continued breathing of the bird and the undesirable drawing of blood into the lungs of the bird. This is undesirable because the proper processing of meat, such as poultry, requires that as much blood as possible be removed from the body of the bird.

Thus, the killing of poultry as it moves along a processing line in stunned condition has commonly been accomplished by severing the jugular vein without, whenever possible, also severing the spinal cord or the windpipe. The automatic mechanical killing devices heretofore available have been unable to accomplish this processing operation in a completely satisfactory manner, however, since, in many instances, they often cut the neck of the bird too deeply so that the neck bone itself is partially cut and the gullet, spinal cord and windpipe are also cut.

The method is carried out very well manually on low production lines when the processor has a good operator who is able to cut the jugular vein without cutting the windpipe or cutting into the neck bone itself. Most modern processing plants, however, have a very high production rate and, as a result of this production rate, the manual operator is so rushed that he, too, often cuts deeply into the neck of the bird. Besides the aforementioned problems, two additional problems are created when the neck of the bird is cut too deeply. First, since the neck skin has been cut, the neck is usually contaminated when the chicken is passed through the scalding bath, and secondly, it has been found that the head of the chicken may easily be knocked off during the feather-picking operation which is conducted further down the poultry processing line. As a result of this contamination, removal of an additional portion of the neck that is left after the head removal may be required. Also, new eviscerating methods are contemplated, in which the windpipe and the gullet are removed with the head, and this process is hampered by the fact that the gullet and windpipe are frequently cut by existing chicken killing devices.

Thus, it is preferable that the killing of poultry as it moves along a processing line in stunned condition be accomplished not only without severing the spinal cord, gullet or windpipe, but even without cutting the neck skin of the bird.

SUMMARY OF THE INVENTION

Accordingly, it is an object of the present invention to provide a new and improved method of killing chickens and other fowl in a completely satisfactory and fully automatic manner as the bird passes along the usual processing line.

Another object of the present invention is to provide a novel method of killing chickens and other fowl without cutting the neck of the bird, but which still provides for the proper bleeding thereof and prevents the occurrence of muscular spasms.

Yet another object of this invention is to provide an improved apparatus for automatically killing poultry which does not require that the neck of the bird be cut.

Still another object of this invention is to provide an improved apparatus for automatically stunning and killing chickens and other fowl which reduces the chances of contamination and permits the subsequent removal of the windpipe and gullet with the head of the bird.

A still further object of the invention is to provide an improved apparatus for automatically stunning and killing poultry in rapid sequence.

These and other objects are attained by a continuous operation involving the severing of the artery going to the brain and eyes of the chicken or other fowl being conveyed along a processing line in a head lowermost position at the base of the brain by making a saw-cut or similar opening through the skull of the bird. An electrical shocking device is preferably provided for stunning the chicken or other fowl as it is being conveyed to the cutting, or killing, device of the apparatus.

BRIEF DESCRIPTION OF THE DRAWINGS

These and other features and advantages of the present invention will be more clearly understood from the following detailed description when considered in connection with the accompanying Drawings, in which like reference numerals designate like or corresponding parts throughout the several views, and wherein:

FIG. 1 is a general overall view in perspective of an apparatus constructed in accordance with and embodying the principles of the present invention;

FIG. 2 is a view in perspective of a portion of the apparatus illustrated in FIG. 1 and showing a chicken being conveyed toward the stunning and killing devices of the present invention with the head of the chicken being engaged between a special pair of spaced and parallel guide members;

FIG. 3 is a view in perspective of a chicken shown after it has been stunned and just prior to being conveyed into the path of a cutting blade; and, FIG. 4 is a diagrammatic sketch of the head of a chicken showing the position therein which is to be cut in accordance with the teachings of the present invention.

DESCRIPTION OF AN ILLUSTRATED EMBODIMENT

Referring now to FIG. 1, there is shown a chicken or other fowl 11 suspended head lowermost from a shackle which travels along an overhead conveyor, not shown, for moving the bird through a poultry processing line, being moved in the direction of a stunning and killing device generally indicated by the reference numeral 13 and constructed in accordance with the teachings of the present invention. The neck of the bird is first received between a pair of guide bars 15 and 17 for introduction to the stunning and killing device 13, which together form a wider throat at the entrance thereto and terminate in a narrow channel 19. The guide bars 15 and 17 are slightly inclined downwardly and away from the conveying unit in order that they may not only guide the neck of the bird 11 through the narrow channel 19, but also engage the head of the bird and force it downward away from the body of the bird. This downward motion of the guide bars 15 and 17 causes the neck of the bird to be stretched for being received between a pair of spaced apart guide rails 21 and 23, which may be constructed of teflon or the like, with the head 25 of the bird 11 being disposed therebelow and oriented with the long axis of the head being perpendicular to the bird's line of motion between the guide rails 21 and 23, as illustrated in FIG. 2.

Continued movement of the chicken or other fowl 11 in the direction indicated by the line-of-motion arrow 27 causes the back of the head 25 of the bird 11 to be engaged, or contacted, by a stunning device which is shown as a wheel-shaped wire brush 29. The wire brush 29 is mounted on a motor-driven shaft for rotation about the axis thereof and is connected to an electrical power source of substantially 110 volts such that a spinning, multiple-pointed electrode is essentially established thereby. The electrode brush 29 is positioned on the supporting structure 31 of the stunning and killing device 13 in such a manner that the plane in which it spins is substantially perpendicular to the stretched neck of the bird. A small arcuate portion of the brush is designed to extend into the space between the guide rails 21 and 23 immediately below the same for contacting the head 25 of the bird 11 and rendering a slight shock sufficient for stunning the bird. Because of the brush characteristics of the shocking device 29, the feathers on the back of the head of the bird contacted thereby are wiped away to provide a more efficient operation of the device by permitting better contact to be made between the electrode and the bird.

Following the electrode brush 29, in the direction of movement of the chicken or the like 11 through the stunning and killing device 13, there is shown in FIG. 3 a pair of head positioning rails 33 and 35 disposed below the horizontal, neck-engaging guide rails 21 and 23. One of the rails 33 lies substantially parallel to the channel 37 defined by the guide rails 21 and 23, or the line of motion 27, for engaging the back of the head 25 of the bird 11, and the other rail 35 is spaced therebelow at the approach end thereof and may be angularly disposed to the rail 33 and slightly inclined in the direction of the line of motion 27 for engaging the upper beak of the chicken and causing the same, and thereby the head 25, to be pivoted upwardly into a substantially horizontal position with the back of the head of the bird facing downwardly. In this manner, the head positioning rails 33 and 35 insure that the head of the bird is held in the proper position to be cut.

Disposed in a vertical plane and extending partly between the head positioning rails 33 and 35 is a saw blade 39 of the fine tooth rip saw type generally used for cutting wood. The saw and its associated motor are adjustable with respect to the guide rails 21 and 23 holding the neck of the chicken for varying the depth of cut in the chicken's head and the positioning rails 33 and 35 for the head on each side of the saw blade 39 are also adjustable for changing the position of the head slightly so that the cut can be made promptly.

Referring now to FIG. 4, it may be seen that the present invention is designed to make a saw cut 41 through the skull 43 of a chicken head 25 which severs the artery 45 going to the brain 47 and the eyes 49, at the base of the brain, and leaves a large enough space for the blood to drain out through the head. Thus, the objectives of the invention are fully obtained by making a cut entirely in the skull so that the neck skin, the windpipe and the gullet are not cut, thereby permitting the windpipe and gullet to be removed with the head in a manner desired according to recently proposed eviscerating methods.

Also, the neck is not contaminated at all when the fowl is passing through the scalding bath to scald the chicken for picking, which results in a substantial saving in high-speed processing plants of the edible weight of the neck retained by this process.

An additional advantage obtained by cutting through the brain as herein-described is that the instantaneous paralyzation of the muscles which is effected in this manner has been found to permit the feathers to be more easily removed. This is an improvement over some previous methods which caused the bird to go into shock and become stiff, thereby making it very difficult to pick the bird in the feather-picking apparatus.

Obviously, many modifications and variations of the present invention are possible in the light of the above teachings. Other forms of electrical shocking devices, for example, may be utilized for stunning the chicken or other fowl. It is therefore to be understood that within the scope of the appended claims, the invention may be practiced otherwise than as specifically described.

What is claimed is:

1. A method for killing poultry comprising the steps of:
   conveying the fowl along a predetermined path;
   automatically stunning said fowl at a given point in said predetermined path; and,
   automatically cutting through the skull of the bird at the back of the head thereof for severing the artery going to the brain and eyes at the base of the brain at another given point in said predetermined path.
2. The method set forth in claim 1, wherein said fowl is electrically stunned.
3. The method as set forth in claim 1 wherein the cutting is of sufficient depth to effect bleeding of the bird through the head to cause death and wherein the neck of the bird remains intact with the head attached thereto.
4. The method as set forth in claim 1 wherein said cutting is made in response to movement of the bird along said predetermined path.

* * * * *